US 9,121,631 B2

(12) United States Patent
Cho et al.

(10) Patent No.: US 9,121,631 B2
(45) Date of Patent: Sep. 1, 2015

(54) AIR CONDITIONER AND METHOD OF OPERATING AN AIR CONDITIONER

(75) Inventors: Changhwan Cho, Changwon-si (KR); Hongseok Choi, Changwon-si (KR); Sunyoung Kang, Changwon-si (KR); Junhyeon Hwang, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 427 days.

(21) Appl. No.: 13/617,047

(22) Filed: Sep. 14, 2012

(65) Prior Publication Data

US 2013/0091877 A1    Apr. 18, 2013

(30) Foreign Application Priority Data

Oct. 17, 2011    (KR) .................. 10-2011-0106030

(51) Int. Cl.
*F25B 7/00* (2006.01)
*F25B 49/02* (2006.01)
*F25B 13/00* (2006.01)

(52) U.S. Cl.
CPC .............. *F25B 49/027* (2013.01); *F25B 13/00* (2013.01); *F25B 2313/0234* (2013.01); *F25B 2339/047* (2013.01); *F25B 2400/0751* (2013.01); *F25B 2500/26* (2013.01); *F25B 2600/021* (2013.01);
(Continued)

(58) Field of Classification Search
CPC .......... F25B 7/00; F25B 13/00; F25B 41/062; Y02B 30/62
USPC ................. 62/79, 238.1, 238.7, 115
See application file for complete search history.

(56) References Cited

U.S. PATENT DOCUMENTS 4,055,963 A * 11/1977 Shoji et al. ................... 62/238.6
4,178,769 A * 12/1979 Johnsen .......................... 62/180
(Continued)

FOREIGN PATENT DOCUMENTS

DE    10 2006 016 750    11/2006
EP         1 719 960        11/2006
(Continued)

OTHER PUBLICATIONS

International Search Report dated Feb. 6, 2013. (PCT/KR2012/007776).
(Continued)

*Primary Examiner* — Melvin Jones
(74) *Attorney, Agent, or Firm* — Ked & Associates, LLP

(57) ABSTRACT

An air conditioner and a method of operating an air conditioner are provided. The air conditioner may include at least one indoor device having an indoor heat exchanger that evaporates or condenses a refrigerant by heat exchange with indoor air; at least one outdoor device having a variable capacity compression device that sucks in and compresses a refrigerant of a refrigerant intake passage and discharges the refrigerant to a refrigerant discharge passage, a water-refrigerant heat exchanger that condenses or evaporates a refrigerant by heat exchange with heat source water, and an outdoor expansion device installed between the indoor heat exchanger of the at least one indoor device and the water-refrigerant heat exchanger; a heat source water flow path connected to the water-refrigerant heat exchanger; a pump installed on the heat source water flow path; and a variable flow valve installed on the heat source water flow path. An opening degree of the variable flow valve is varied depending on a pressure of at least one of the refrigerant discharge passage or the refrigerant intake passage.

23 Claims, 5 Drawing Sheets

(52) U.S. Cl.
CPC . *F25B 2600/0271* (2013.01); *F25B 2600/0272* (2013.01); *F25B 2700/1931* (2013.01); *F25B 2700/1933* (2013.01); *Y02B 30/741* (2013.01)

(56) References Cited

U.S. PATENT DOCUMENTS

| | | | | |
|---|---|---|---|---|
| 4,254,630 | A | * | 3/1981 | Geary ............................. 62/79 |
| 4,285,392 | A | * | 8/1981 | Rannow ........................ 165/50 |
| 4,373,345 | A | * | 2/1983 | Tyree et al. ..................... 62/79 |
| 4,796,439 | A | * | 1/1989 | Yamada et al. ................. 62/159 |
| 7,017,353 | B2 | * | 3/2006 | Gist et al. ........................ 62/73 |
| 2003/0159456 | A1 | | 8/2003 | Cowans |
| 2008/0087027 | A1 | | 4/2008 | Park et al. |

FOREIGN PATENT DOCUMENTS

| | | |
|---|---|---|
| EP | 2 196 745 | 6/2010 |
| JP | 2009-264715 | 11/2009 |
| KR | 10-2010-0015104 | 2/2010 |
| KR | 10-2010-0046694 | 5/2010 |

OTHER PUBLICATIONS

European Search Report dated Jul. 8, 2014.
European Search Report dated Mar. 12, 2014.

* cited by examiner

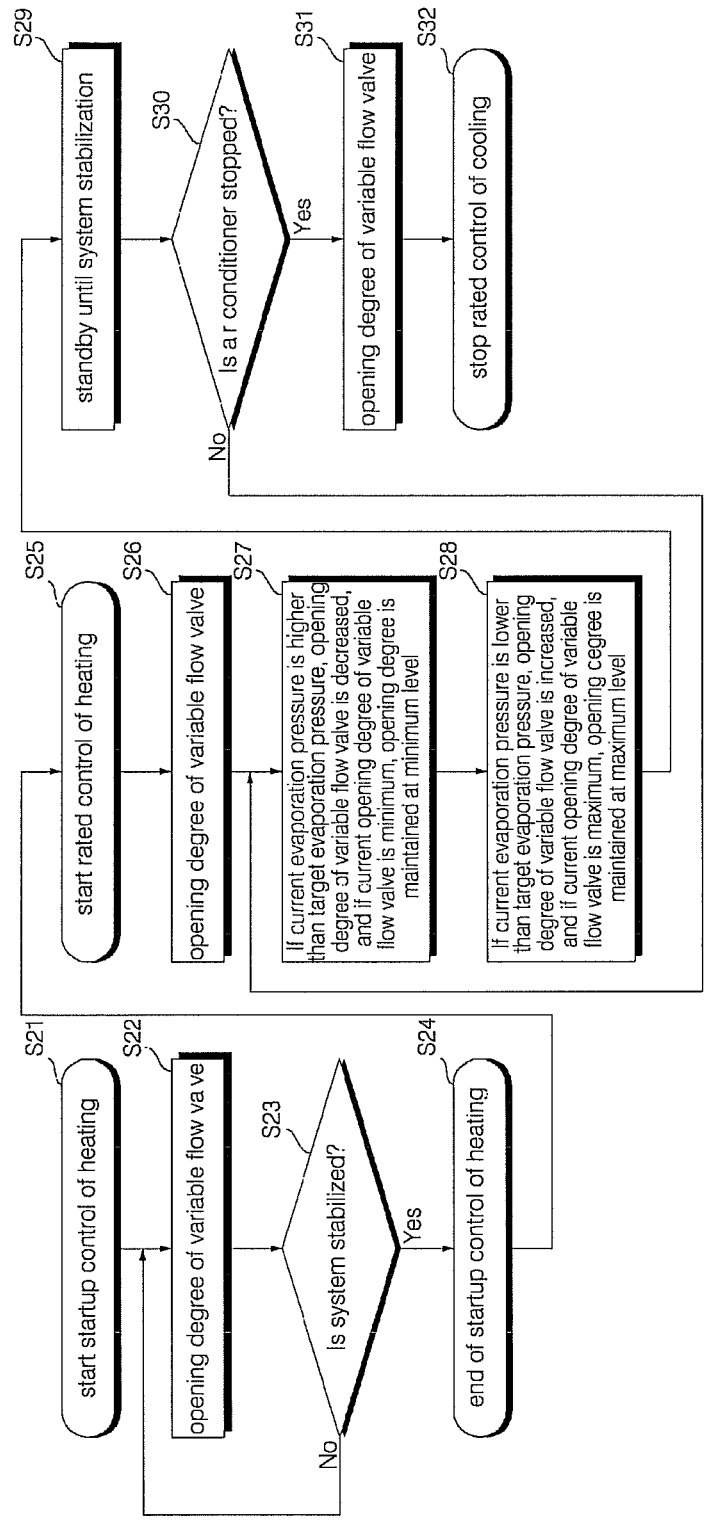

AIR CONDITIONER AND METHOD OF OPERATING AN AIR CONDITIONER

CROSS-REFERENCE TO RELATED APPLICATION(S)

This application claims priority under 35 U.S.C. §119 to Korean Application No. 10-2011-0106030 filed in Korea on Oct. 17, 2011, whose entire disclosure is hereby incorporated by reference.

BACKGROUND

1. Field

An air conditioner and a method of operating an air conditioner are disclosed herein.

2. Background

Air conditioners are known. However, they suffer from various disadvantages.

BRIEF DESCRIPTION OF THE DRAWINGS

Embodiments will be described in detail with reference to the following drawings in which like reference numerals refer to like elements, and wherein:

FIG. 5 is a flow chart of a heating operation in a method of operating an air conditioner according to an embodiment.

DETAILED DESCRIPTION

Figure 1:
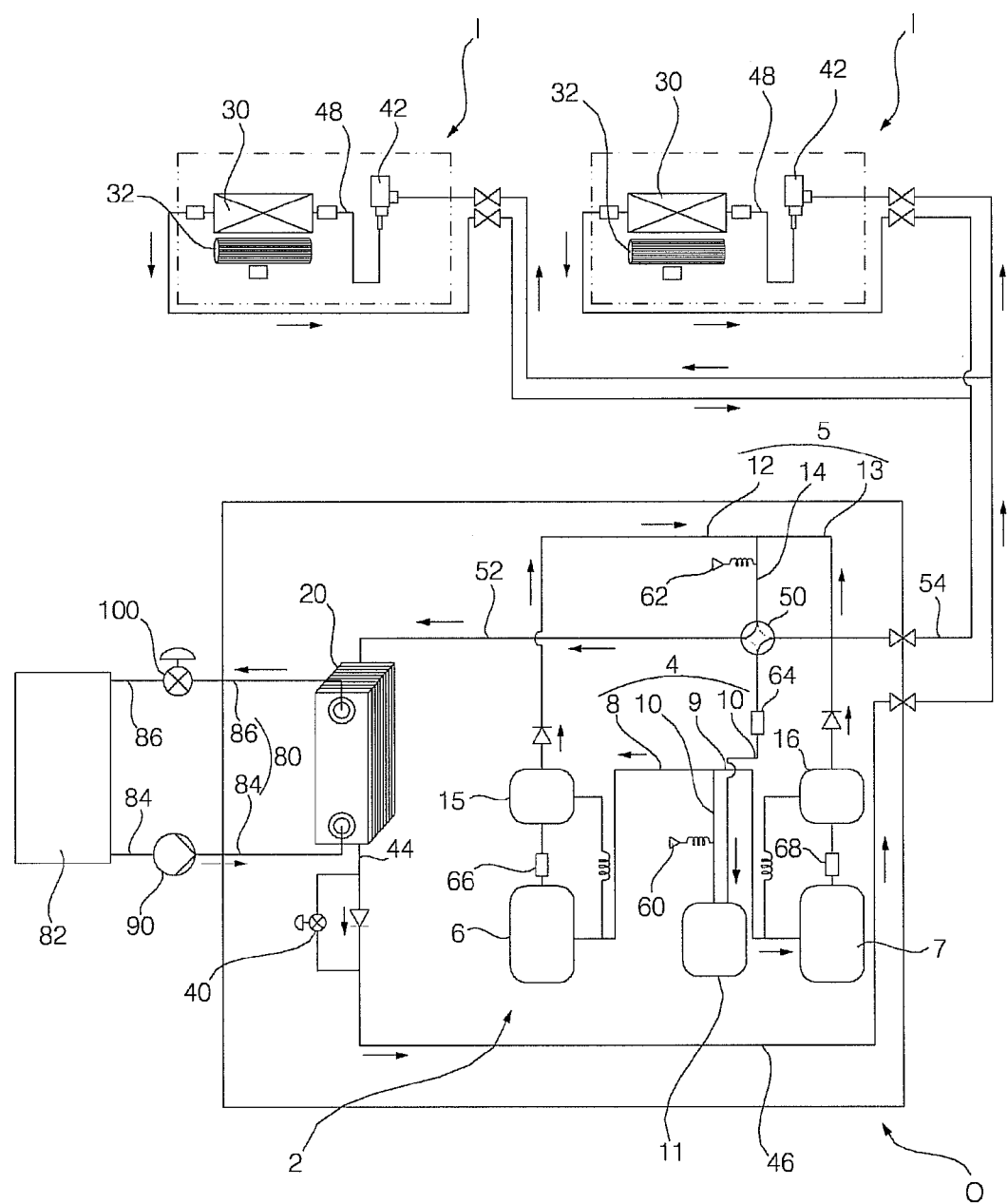
FIG. 1 is a schematic diagram showing a refrigerant flow and a heat source water flow during a cooling operation of an air conditioner according to an embodiment.

Hereinafter, an air conditioner according to embodiments will be described below with reference to the accompanying drawings. Where possible, like reference numerals have been used to indicate like elements.

Generally, an air conditioner is an appliance that cools or heats a room using a refrigerating cycle of a refrigerant, which performs a cooling operation or a heating operation by sequentially compressing, condensing, expanding, and evaporating the refrigerant and absorbing surrounding heat when the refrigerant is vaporized and releasing the heat when the refrigerant is liquefied. Such an air conditioner is able to condense or evaporate the refrigerant with outdoor air, and also to condense or evaporate the refrigerant with heat source water.

Such an air conditioner may include a water-refrigerant heat exchanger that provides heat exchange between heat source water and a refrigerant, and which is installed between a compressor and an expansion device to allow the refrigerant to be condensed or evaporated with the water. The water-refrigerant heat exchanger may be, for example, a plate-type heat exchanger, in which a refrigerant flow path, through which a refrigerant may flow, and a heat source water flow path, through which heat source water may flow, may be separated by a heat transfer plate. An inflow path that supplies heat source water to the water-refrigerant heat exchanger and an outflow path that allows the heat source water heat-exchanged with the refrigerant to flow out of the plate-type heat exchanger may be provided. A pump that pumps the heat source water to the water-refrigerant heat exchanger and a variable flow valve that regulates a flow rate of the heat source water coming in and out of the water-refrigerant heat exchanger may be installed in the inflow path or the outflow path.

Korean Patent Application Publication No. 10-2010-0005820 discloses an air conditioner that regulates an opening degree of a variable flow valve using an operating rate of a compressor depending on an operation capacity of an indoor unit or device, or using a temperature sensed in a water recovery tube. However, the air conditioner disclosed in Korean Patent Application Publication No. 10-2010-0005820 has a problem that a flow control valve is controlled regardless of a pressure of an outdoor unit or device, and it is difficult to optimize a refrigerant cycle.

Figure 2:
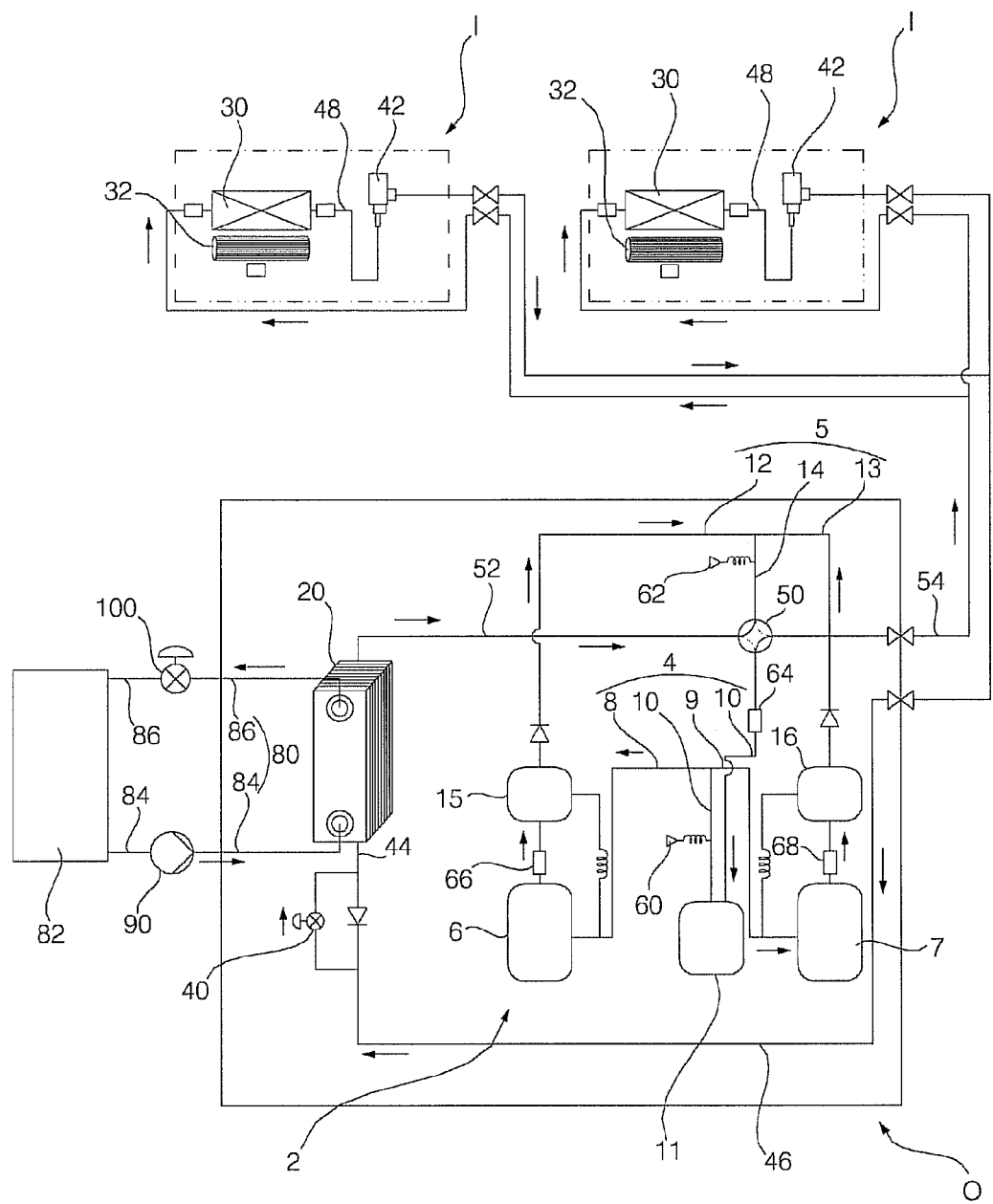
FIG. 2 is a schematic diagram showing a refrigerant flow and a heat source water flow during a heating operation of an air conditioner according to an embodiment.

FIG. 1 is a schematic diagram showing a refrigerant flow and a heat source water flow during a cooling operation of an air conditioner according to an embodiment. FIG. 2 is a schematic diagram showing a refrigerant flow and a heat source water flow during a heating operation of the air conditioner according to an embodiment.

The air conditioner of FIGS. 1-2 may include a compression device 2 that compresses a refrigerant, a water-refrigerant heat exchanger 20 that condenses or evaporates the refrigerant by heat exchange with water (hereinafter, referred to as heat source water), an indoor heat exchanger 30 that evaporates or condenses the refrigerant by heat exchange with indoor air, and expansion devices 40 and 42 installed between the water-refrigerant heat exchanger 20 and the indoor heat exchanger 39. The air conditioner may further include a cooling/heating switching valve 50 that switches between a cooling operation and a heating operation.

The compression device 2 may suck and compress the refrigerant from a refrigerant intake passage 4 and then discharges it to a refrigerant discharge passage 5. The compression device 2 may be configured to be variable in capacity. The compression device 2 may include at least one compressor 6 and 7 connected to the refrigerant intake passage 4 and the refrigerant discharge passage 5.

The at least one compressor 6 and 7 may include one inverter compressor having a variable compression capacity, or may include an inverter compressor with variable compression capacity and a constant speed compressor having a constant compression capacity. The exemplary embodiment of FIGS. 1-2 includes an inverter compressor 6 and a constant speed compressor 7.

The refrigerant intake passage 4 may be connected in parallel to the inverter compressor 6 and the constant speed compressor 7. The refrigerant intake passage 4 may include an inverter compressor intake passage 8 connected to the inverter compressor 6, a constant speed compressor intake passage path 9 connected to the constant speed compressor 7, and a common intake passage 10 connected to the inverter compressor intake passage 8 and the constant speed compressor intake passage 9.

An accumulator 11 that accumulates liquid refrigerant from the refrigerant may be installed on the refrigerant intake passage 4. The accumulator 11 may be installed on the common intake passage 10.

The refrigerant discharge passage 5 may be connected in parallel to the inverter compressor 6 and the constant speed compressor 7. The refrigerant discharge passage 5 may include an inverter compressor discharge passage 12 connected to the inverter compressor 6, a constant speed compressor discharge passage 13 connected to the constant speed compressor 7, and a common discharge passage 14 connected to the inverter compressor discharge passage 12 and the constant speed discharge passage 13.

An inverter compressor oil separator 15 may be installed on the refrigerant discharge passage 5 to separate oil from the refrigerant discharged from the inverter compressor 6 and return it to the refrigerant intake passage 4. A constant speed compressor oil separator 16 may be installed on the refrigerant discharge passage 5 to separate oil from the refrigerant discharged from the constant speed compressor 7 and return it to the refrigerant intake passage 4.

The water-refrigerant heat exchanger 20 may function as a condenser that condenses the refrigerant by heat exchange between the heat source water and the refrigerant in a cooling operation, and as an evaporator that evaporates the refrigerant by heat exchange between the heat source and the refrigerant in a heating operation. The water-refrigerant heat exchanger 20 may condense the refrigerant flowing from the cooling/heating switching valve 50 by heat exchange with the heat source water in the cooling operation, and evaporate the refrigerant flowing from the expansion devices 40 and 42 by heat exchange with the heat source water in the heating operation. The water-refrigerant heat exchanger 20 may be include a refrigerant heat exchange passage that condenses or evaporates a refrigerant passing therethrough and a heat source water heat exchange passage that heats or cools heat source water passing therethrough.

The water-refrigerant heat exchanger 20 may be a plate-type heat exchanger or a shell tube-type heat exchanger. In the case that the water-refrigerant heat exchanger 20 is a plate-type heat exchanger, the refrigerant heat exchange passage and the heat source water heat exchange passage may be separated by a plate-type heat transfer member, and the refrigerant and water may be heat-exchanged through the heat transfer member. In the case that the water-refrigerant heat exchanger 20 is a shell tube-type heat exchanger, the refrigerant heat exchange passage and the heat source water heat exchange passage may be separated by a tube disposed within a shell, and the refrigerant and the heat source water may be heat exchanged through the tube.

The indoor heat exchanger 30 may function as an evaporator that evaporates the refrigerant by heat exchange between indoor air and the refrigerant in the cooling operation, and as a condenser that condenses the refrigerant by heat exchange between the indoor air and the refrigerant in the heating operation. The indoor heat exchanger 30 may evaporate the refrigerant flowing from the expansion devices 40 and 42 by heat exchange with the indoor air in the cooling operation, and condense the refrigerant flowing from the cooling/heating switching valve 50 by heat exchange between the refrigerant and the indoor air in the heating operation. The indoor heat exchanger 30 may heat-exchange the refrigerant with the indoor air by an indoor fan 32 that blows indoor air to the indoor heat exchanger 30.

The expansion devices 40 and 42 may include one refrigerant expansion device installed between the water-refrigerant heat exchanger 20 and the indoor heat exchanger 30, and may include an outdoor expansion device 40 installed closer to the water-refrigerant heat exchanger 20 than to the indoor heat exchanger 30 and an indoor expansion device 42 installed closer to the indoor heat exchanger 30 than to the water-refrigerant heat exchanger 20. The outdoor expansion device 40 may be installed between the water-refrigerant heat exchanger 20 and the indoor heat exchanger 30 and expand the refrigerant flowing toward the water-refrigerant heat exchanger 20. The outdoor expansion device 40 may be connected to the water-refrigerant heat exchanger 20 by a water-refrigerant heat exchange connection pipe 44. The outdoor expansion device 40 may be connected to the indoor expansion device 42 by an expansion device connection pipe 46. The indoor expansion device 42 may be installed between the outdoor expansion device 40 and the indoor heat exchanger 30 and may expand the refrigerant flowing toward the indoor heat exchanger 30. The indoor expansion device 42 may be connected to the indoor heat exchanger 30 by an indoor heat exchanger connection pipe 48.

The cooling/heating switching valve 50 may be connected to the refrigerant intake passage 4, the refrigerant discharge passage 5, the water-refrigerant heat exchanger 20, and the indoor heat exchanger 30. The cooling/heating switching valve 50 may be connected to the common intake passage 10 of the refrigerant intake passage 4. The cooling/heating switching valve 50 may be connected to the common discharge passage 14 of the refrigerant discharge passage 5. The cooling/heating switching valve 50 may be connected to the water-refrigerant heat exchanger 20 by a water-refrigerant heat exchanger connection pipe 52. The cooling/heating switching valve 50 may be connected to the indoor heat exchanger 30 by an indoor heat exchanger connection pipe 54.

In a cooling operation, the cooling/heating switching valve 50 may guide the refrigerant compressed in the compression device 2 and discharged to the refrigerant discharge passage 5 to flow to the water-refrigerant heat exchanger 20 and guide the refrigerant flowing from the indoor heat exchanger 30 to flow to the refrigerant intake passage 4. In a heating operation, the cooling/heating switching valve 50 may guide the refrigerant compressed in the compression device 2 and discharged to the refrigerant discharge passage 5 to flow to the indoor heat exchanger 30 and guide the refrigerant flowing from the water-refrigerant heat exchanger 20 to flow to the refrigerant intake passage 4.

The air conditioner may include a low-pressure sensor 60 that senses a pressure in the refrigerant intake passage 4, and a high-pressure sensor 62 that senses a pressure in the refrigerant discharge passage 5. The low-pressure sensor 60 may be installed on the refrigerant intake passage 4, more specifically, on the common intake passage 10 of the refrigerant intake passage 4 to sense the pressure of the refrigerant passing through the common intake passage 10. The high-pressure sensor 62 may be installed on the refrigerant discharge passage 5, more specifically, on the common discharge passage 14 of the refrigerant discharge passage 5 to sense the pressure of the refrigerant passing through the common discharge passage 14.

The air conditioner may further include an intake temperature sensor 64 installed on the refrigerant intake passage 4 and discharge temperature sensors 66 and 68 installed on the refrigerant discharge passage 5. The intake temperature sensor 64 may be installed on the common intake passage 10 of the refrigerant intake passage 4 and sense the temperature of the refrigerant passing through the common intake passage 10. The discharge temperature sensors 66 and 68 may include an inverter compressor discharge temperature sensor 66 installed on the inverter compressor discharge passage 12 of the refrigerant intake passage 4 to sense the temperature of the refrigerant passing through the inverter compressor discharge passage 12, and a constant speed compressor discharge temperature sensor 68 installed on the constant speed compressor discharge passage 13 of the refrigerant intake passage 4 to sense the temperature of the refrigerant passing through the constant speed compressor discharge passage 13.

The air conditioner may further include a heat source water flow path 80 connected to the water-refrigerant heat exchanger 20; a pump 90 installed on the heat source water flow path 80; and a variable flow valve 100 installed on the heat source water flow path 20 and capable of regulating the opening degree thereof.

The heat source water flow path 80 may be connected to external heat exchange equipment 82 that heat-exchanges the heat source water, which is heat-exchanged with the refrigerant in the water-refrigerant heat exchanger 20, with outdoor air or ground heat. The heat source water flow path 80 may include an inflow path 84 that allows the heat source water having passed through the external heat exchange equipment 82 to flow into the water-refrigerant heat exchanger 20 and an outflow path 86 that allows the heat source water heat-exchanged with the refrigerant in the water-refrigerant heat exchanger 20 to flow out to the external heat exchange equipment 82. The external heat exchange equipment 82 may include a cooling tower that cools the heat source water having flowed out through the outflow path 86 with outdoor air, a ground heat exchanger that exchanges the heat source water having flowed out through the outflow path 86 with ground heat, or a boiler that heats the heat source water having flowed out through the outflow path 86, or may be a combination of the cooling tower, the ground heat exchanger, and the boiler.

A pump 90 may pump heat source water so that the heat source water circulates through the water-refrigerant heat exchanger 20 and the external heat exchange equipment 82. The pump 90 may be installed on at least one of the inflow path 84 or the outflow path 86. The pump 90 may be a variable capacity pump, or an inverter pump that varies in capacity depending on input frequency, or a plurality of constant speed pumps having a variable pumping capacity. The pump 90 may include a pressure sensor that senses pressure. If a pressure drop becomes larger due to a decrease in the opening degree of the variable flow valve 100, the pressure sensor may sense this, a number of turns of the pump 90 may be decreased, and the power consumption input to the pump 90 may be minimized. On the other hand, if a pressure drop becomes smaller due to an increase in the opening degree of the variable flow valve 100, the pressure sensor may sense this, and the number of turns of the pump 90 may be increased.

The variable flow valve 100 may regulate the heat source water flowing in and out of the water-refrigerant heat exchanger 20. The variable flow valve 100 may vary the flow rate of the heat source water circulating through the heat source water flow path 80 by adjusting the opening degree. The variable flow valve 100 may be installed on at least one of the inflow path 84 or the outflow path 86.

The variable flow valve 100 may be opened to a maximum opening degree when fully opened, and opened to a minimum opening degree when fully closed. The variable flow valve 100 may maximize the flow rate of the heat source water flow path 80 when the opening degree is maximum, and minimize the flow rate of the heat source water flow path 80 when the opening degree is minimum.

The variable flow valve 100 may be fully opened at a start-up of a cooling operation or a heating operation. That is, the variable flow valve 100 may be opened to the maximum opening degree at the start-up of the cooling operation or the heating operation, thereby maximizing the flow rate of the heat source water of the heat source water flow path 80. When the start-up of the cooling operation or the heating operation is completed, the opening degree may be varied and the variable flow valve 100 may regulate the flow rate of the heat source flow path 80 to be different from that for the start-up of the cooling operation or the heating operation.

When increasing or decreasing the opening degree of the variable flow valve 100, the variable flow valve 100 may be regulated to an opening degree obtained by increasing or decreasing the current opening degree by a predetermined opening degree amount. When increasing or decreasing the opening degree of the variable flow valve 100 a plurality of times, the opening degree may be gradually increased or decreased in increments of a set opening degree amount.

The opening degree of the variable flow valve 100 may be varied depending on a pressure of at least one of the refrigerant discharge passage 5 or the refrigerant intake passage 4. In a cooling operation, the opening degree of the variable flow valve 100 may be varied depending on the pressure of the refrigerant discharge passage 5. In the cooling operation, if the pressure of the refrigerant discharge passage 5 is lower than a target condensation pressure, the opening degree of the variable flow valve 100 may be decreased. In the cooling operation, if the pressure of the refrigerant discharge passage 5 is lower than the target condensation pressure, the opening degree of the variable flow valve 100 may be decreased. In the cooling operation, the opening degree of the variable flow valve 100 may be varied depending on a sensed pressure of the high-pressure sensor 62 and the target condensation pressure. The sensed pressure of the high-pressure sensor 62 may become the pressure of the refrigerant discharge passage 5.

In the cooling operation, the target condensation pressure may be determined according to a magnitude of the load of the indoor device O, especially, the indoor heat exchanger 30, and the opening degree of the variable flow valve 100 may be increased or decreased based on a comparison between the sensed pressure and the target condensation pressure. In the cooling operation, if the sensed pressure of the high-pressure sensor 62 is higher than the target condensation pressure, the opening degree of the variable flow valve 100 may be increased. In the cooling operation, if the pressure sensed by the high-pressure sensor 62 is lower than the target condensation pressure, the opening degree of the variable flow valve 100 may be decreased. In the cooling operation, upon an increase in the opening degree, if the current opening degree of the variable flow valve 100 is the maximum opening degree, the current opening degree may be maintained. In the cooling operation, upon a decrease in the opening degree, if the current opening degree of the variable flow valve 100 is the minimum opening degree, the current opening degree may be maintained.

In the heating operation, the opening degree of the variable flow valve 100 may be varied depending on a pressure in or of the refrigerant intake passage 4. If the pressure of the refrigerant intake passage 4 is higher than a target evaporation pressure, the opening degree of the variable flow valve 100 may be decreased. If the pressure of the refrigerant intake passage 4 is lower than the target evaporation pressure, the opening degree of the variable flow valve 100 may be increased.

In the heating operation, the opening degree of the variable flow valve 100 may be varied depending on a sensed pressure of the low-pressure sensor 60 and the target evaporation pressure. The sensed pressure of the low-pressure sensor 60 may become the pressure of the refrigerant intake passage 4. The target evaporation pressure may be determined according to a magnitude of a load of the indoor device O, especially, the indoor heat exchanger 30, and the opening degree of the variable flow valve 100 may be increased or decreased based on a comparison between the sensed pressure and the target evaporation pressure. In the heating operation, if the sensed pressure of the low-pressure sensor 60 is higher than the target evaporation pressure, the opening degree of the variable flow valve 100 may be decreased. In the heating operation, if the sensed pressure of the low-pressure sensor 60 is lower than the target evaporation pressure, the opening degree of the variable flow valve 100 may be increased. In the heating operation, upon an increase in the opening degree, if the current opening degree of the variable flow valve 100 is the maximum opening degree, the current opening degree may be maintained. In the heating operation, upon a decrease in the opening degree, if the current opening degree of the variable flow valve 100 is the minimum opening degree, the current opening degree may be maintained. The variable flow valve 100 may be fully closed when the air conditioner is stopped.

The indoor heat exchanger 30 may be installed in the indoor device I. The indoor expansion device 42, together with the indoor heat exchanger 30, may be installed in the indoor device I. The indoor fan 32 may be installed in the indoor device I to blow indoor air to the indoor heat exchanger 30. In the air conditioner, the compression device 2 and the water-refrigerant heat exchanger 20 may be installed in the outdoor device O. The outdoor expansion device 40, the cooling/heating switching valve 50, the low-pressure sensor 60, and the high-pressure sensor 62, together with the compression device 2 and the water-refrigerant heat exchanger 20, may be installed in the outdoor device O. The intake temperature sensor 64 and the discharge temperature sensors 66 and 68 may be installed in the outdoor device O. The heat source water flow path 80 may be disposed to penetrate the outdoor device O, the pump 90 and the variable flow valve 100 may be installed at a portion of the heat source water flow path 80, which is positioned outside of the outdoor device O, and the outdoor heat exchange equipment 82 may be installed to be positioned outside the outdoor device O. The outdoor device O may be connected to the variable flow valve 100 installed outside the outdoor device O by a control line, and the variable flow vale 100 may be controlled by the outdoor device O.

Figure 3:
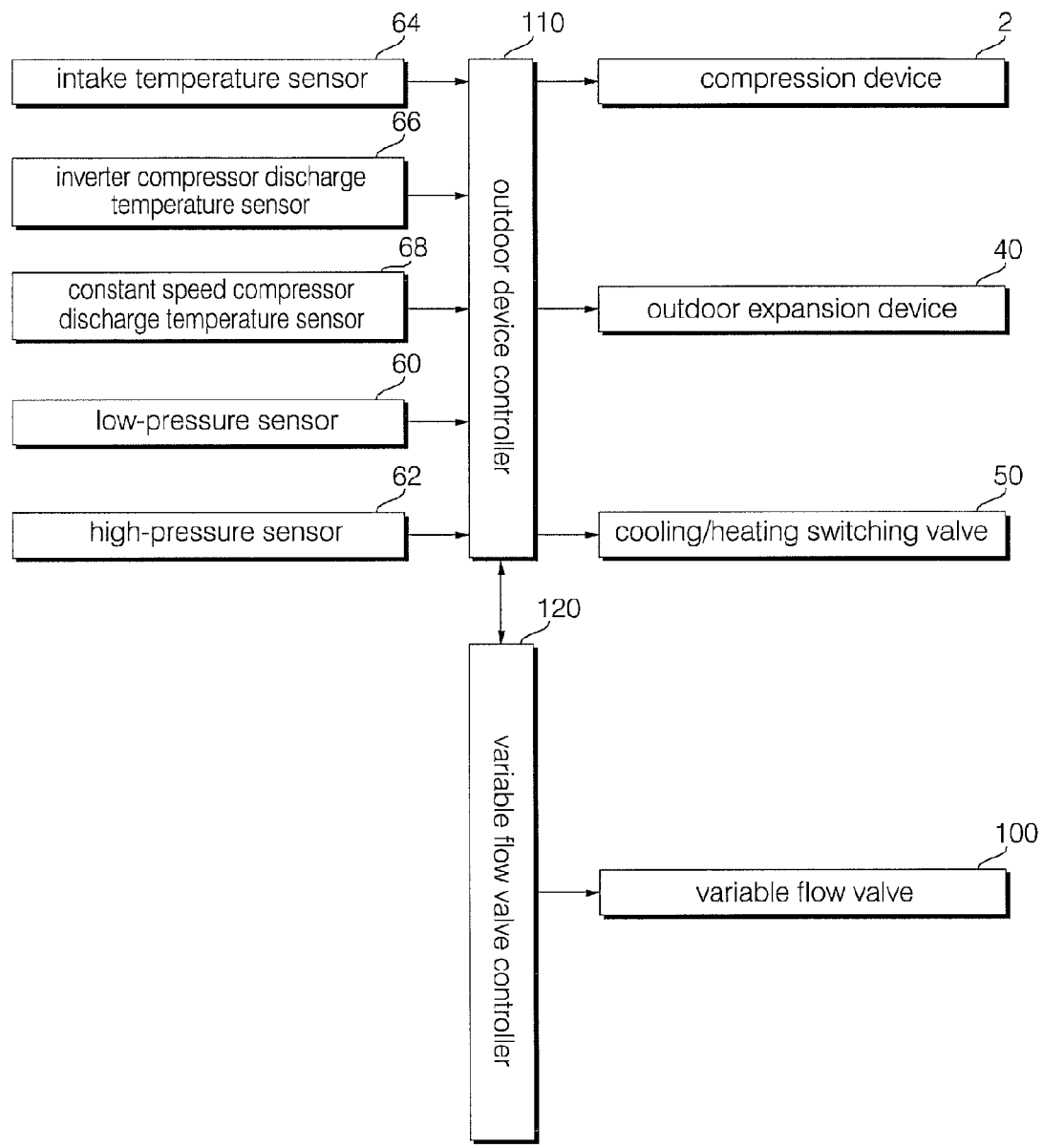
FIG. 3 is a control block diagram of an air conditioner according to an embodiment.

FIG. 3 is a control block diagram of an air conditioner according to an embodiment. The air conditioner according to this embodiment may include an outdoor device controller 110 that controls the compression device 2 and a variable flow valve controller 120 that controls the variable flow valve 100. The outdoor device controller 110 may control the cooling/ heating switching valve 50 and the outdoor expansion valve 40. The outdoor device controller 100 may control at least one of the compression device 2, the cooling/heating switching valve 50, or the outdoor expansion device 40 according to a sensing result of at least one of low-pressure sensor 60, high-pressure sensor 62, intake temperature sensor 64, or discharge temperature sensors 66 and 68.

The variable flow valve controller 120 may communicate with the outdoor device controller 110 via wired or wireless communication. The variable flow valve controller 120 may be connected to the variable flow valve 100 by a signal line.

The low-pressure sensor 60 and the high-pressure sensor 62 may be connected to the variable flow valve controller 120 by a signal line to output a sensed pressure to the variable flow valve controller 120. The variable flow valve controller 120 may determine the opening degree of the variable flow valve 100 based on the sensed pressure and output a signal corresponding to the determined opening degree to the variable flow valve 100.

The low-pressure sensor 60 and the high-pressure sensor 62 may be connected to the outdoor device controller 110 by a signal line to output a sensed pressure to the outdoor device controller 110. The outdoor device controller 110 may output the sensed pressure of the low-pressure sensor 60 and the high-pressure sensor 62 to the variable flow valve controller 120. The variable flow valve controller 120 may determine the opening degree of the variable flow valve 100 based on the sensed pressure to output a signal corresponding to the determined opening degree to the variable flow valve 100.

Figure 4:
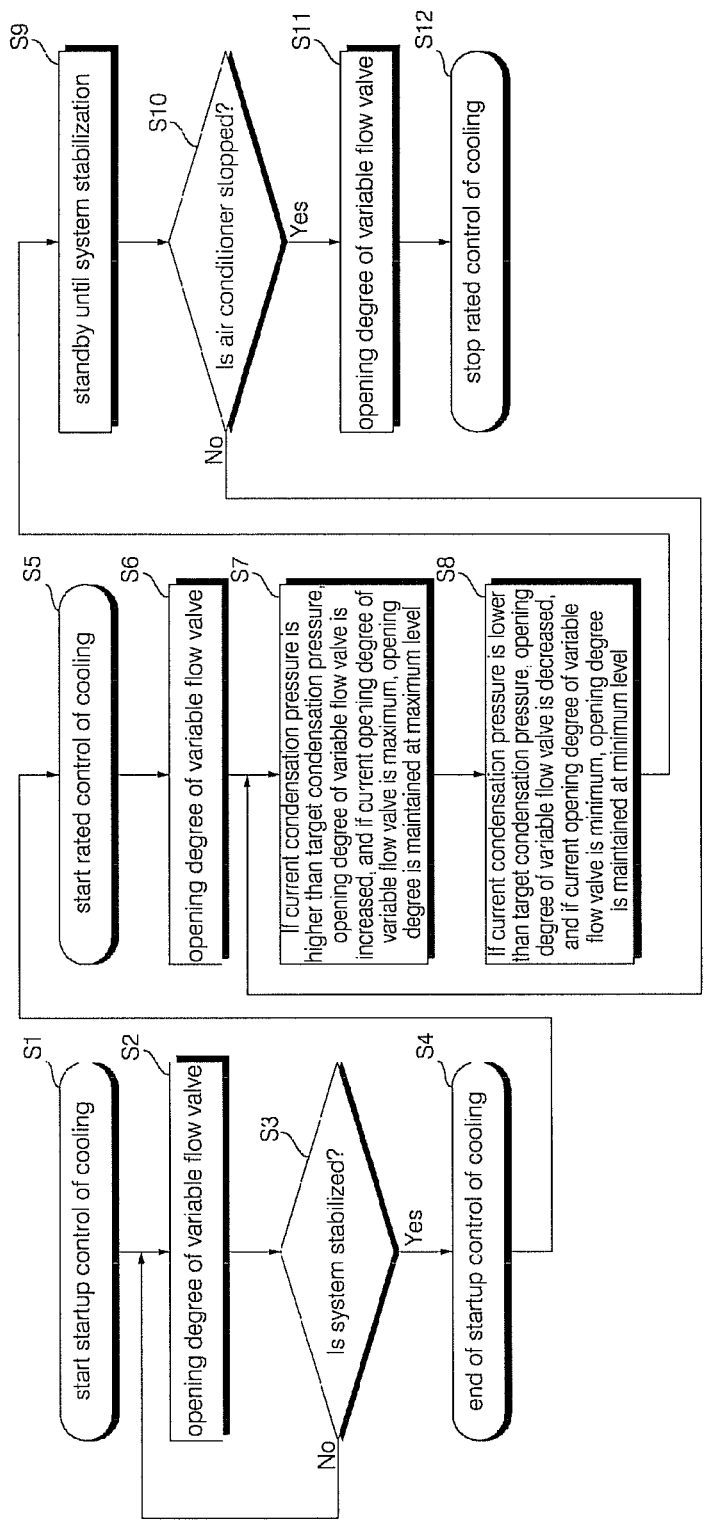
FIG. 4 is a flow chart of a cooling operation in a method of operating an air conditioner according to an embodiment.

FIG. 4 is a flow chart of a cooling operation in a method of operating an air conditioner according to an embodiment.
FIG. 5 is a flow chart of a heating operation in a method of operating an air conditioner according to an embodiment.

The method according to embodiments may include steps S1 to S4 and S21 to S24 of starting up the air conditioner, and steps S5 to S12 and S25 to S32 of rated-controlling after the startup control steps S1 to S4 and S21 to S24.

In the startup control steps S1 to S4 and S21 and S24, upon startup of the air conditioner, a variable flow valve, such as variable flow value 100 of FIG. 1, regulating the heat source water entering and exiting the water-refrigerant heat exchanger 20 may be fully opened, in steps S1, S2, S21, and S22. Upon starting a cooling operation of the air conditioner, a compression device, such as compression device 2 of FIG. 1, may be started up, a pump, such as pump 90 of FIG. 1, may be started up, and the variable flow valve may be opened to maximum opening, in steps S1 and S2.

In the cooling operation, a refrigerant may be compressed in the compression device, such as compression device 2 of FIGS. 1-2, condensed by heat exchange with heat source water in a water-refrigerant heat exchanger, such as water-refrigerant heat exchanger 20 of FIG. 1, expanded in an indoor expansion device, such as indoor expansion device 42 of FIG. 1, and evaporated in an indoor heat exchanger, such as indoor heat exchanger 30 of FIG. 1. As the variable flow valve is opened to the maximum opening degree, the refrigerant may be quickly heat-exchanged with a large quantity of heat source water, and the water-refrigerant heat exchanger may quickly condense the refrigerant. As time gradually passes, a high pressure sensed by a high-pressure sensor, such as high-pressure sensor 62 of FIG. 1, may rise, and a low pressure sensed by a low-pressure sensor, such as low-pressure sensor 60 of FIG. 1, may drop. If the rising gradient of the pressure sensed by the high-pressure sensor is between an upper limit gradient and a lower limit gradient, the pressure of the refrigerant may be deemed as stable. Once the refrigerant pressure of the air conditioner becomes stable, the startup control step in the cooling operation may be completed, in steps S3 and S4.

Upon starting a heating operation of the air conditioner, the compression device may be started, the pump started, and the variable flow valve opened to the maximum opening degree, in steps S21 and S22. A refrigerant may be compressed in the compression device, condensed by heat exchange with indoor air in the indoor heat exchanger, expanded in the outdoor expansion device, and evaporated in the water-refrigerant heat exchanger. As the variable flow valve may be opened to the maximum opening degree, the refrigerant may be quickly heat-exchanged with a large quantity of heat source water, and the water-refrigerant heat exchanger may quickly condense the refrigerant. As time gradually passes, a high pressure sensed by the high-pressure sensor may rise, and a low pressure sensed by the low-pressure sensor may drop. If the rising gradient of the pressure sensed by the high-pressure sensor is between an upper limit gradient and a lower limit gradient, the pressure of the refrigerant is deemed as stable. Once the refrigerant pressure of the air conditioner becomes stable, the startup control step in the heating operation may be completed, in steps S23 and S24.

In the rated control steps S5 to S12 and S25 to S32, after the startup control steps S1 to S4 and S21 to S24, the opening degree of the variable flow valve may be varied depending on the pressure of the refrigerant flowing from the compression device to the water-refrigerant heat exchanger, or the opening degree of the variable flow valve may be varied depending on the pressure of the refrigerant flowing from the water-refrigerant heat exchanger to the compression device.

During the cooling operation, in the rated control steps S5 to S12, the opening degree of the variable flow valve may be varied depending on the pressure of the refrigerant flowing from the compression device to the water-refrigerant heat exchanger. During the heating operation, in the rated control steps S25 to S32, the opening degree of the variable flow valve may be varied depending on the pressure of the refrigerant flowing from the water-refrigerant heat exchanger to the compression device.

First, during the cooling operation, in the rated control steps S5 to S12, if the pressure sensed by the high-pressure sensor is higher than a target condensation pressure, the opening degree of the variable flow valve may be increased. At this point, in the rated control steps S5 to S12, upon an increase in the opening degree of the variable flow valve, if the current opening degree of the variable flow valve is maximum, the current opening degree may be maintained, in steps S5, S6, and S7.

Also, during the cooling operation, in the rated control steps S5 to S12, if the pressure sensed by the high-pressure sensor is lower than the target condensation pressure, the opening degree of the variable flow valve may be decreased. At this point, in the rated control steps S5 to S12, upon a decrease in the opening degree of the variable flow valve, if the current opening degree of the variable flow valve is minimum, the current opening degree may be maintained, in step S8.

During the cooling operation, in the rated control steps S5 to S12, after an increase or decrease in the opening degree of the variable flow valve 100, the air conditioner may remain in standby until the pressure of the refrigerant becomes stable, in step S9.

Upon a change in the opening degree of the variable flow valve, the pressure of the refrigerant may be changed, and the difference between the pressure sensed by the high-pressure sensor and a target condensation pressure may become smaller than a set value, or the difference between the pressure sensed by the low-pressure sensor and a target evaporation pressure may become smaller than a set value. In this case, the pressure of the refrigerant may become stable.

During the cooling operation, in the rated control steps S5 to S12, unless a stop signal of the air conditioner is input, comparison between the condensation pressure sensed by the high-pressure sensor and the target condensation pressure and the corresponding increase or decrease in the opening degree of the variable flow valve and standby may be repeated, in steps S10, S7, S8, and S9.

During the cooling operation, in the rated control steps S5 to S12, when the air conditioner is stopped, i.e., a stop signal of the air conditioner may be input, the variable flow valve may be fully closed and the cooling operation may be completed, in steps S11 and S12. The variable flow valve may be regulated to have the minimum opening degree.

Meanwhile, during the heating operation, in the rated control steps S25 to S32, if the pressure sensed by the low-pressure sensor is higher than a target evaporation pressure, the opening degree of the variable flow valve may be decreased. At this point, in the rated control steps S25 to S32, upon a decrease in the opening degree of the variable flow valve, if the current opening degree of the variable flow valve is minimum, the current opening degree may be maintained, in steps S25, S26, and S27.

Also, during the heating operation, in the rated control steps S25 to S32, if the pressure sensed by the low-pressure sensor is lower than the target evaporation pressure, the opening degree of the variable flow valve may be increased. At this point, in the rated control steps S25 to S32, upon an increase in the opening degree of the variable flow valve, if the current opening degree of the variable flow valve is minimum, the current opening degree may be maintained, in step S28.

During the heating operation, in the rated control steps S25 to S32, after an increase or decrease in the opening degree of the variable flow valve, the air conditioner may remain in standby until the pressure of the refrigerant becomes stable, in step S29. Upon a change in the opening degree of the variable flow valve 100, the pressure of the refrigerant may be changed, and the difference between the pressure sensed by the high-pressure sensor and a target condensation pressure may become smaller than a set value, or the difference between the pressure sensed by the low-pressure sensor and a target evaporation pressure may become smaller than a set value. In this case, the pressure of the refrigerant may become stable.

During the heating operation, in the rated control steps S25 to S32, unless a stop signal of the air conditioner is input, comparison between the evaporation pressure sensed by the low-pressure sensor and the target evaporation pressure and the corresponding increase or decrease in the opening degree of the variable flow valve and standby may be repeated in step S30, S27, S28, and S29.

During the heating operation, in the rated control steps S25 to S32, when the air conditioner is stopped, i.e., a stop signal of the air conditioner is input, the variable flow valve may be fully closed and the heating operation completed, in steps S31 and S32. The variable flow valve may be regulated to have the minimum opening degree.

Embodiments disclosed herein provide an air conditioner, which enables optimization of a refrigerant cycle by controlling an opening degree of a variable flow valve based on a pressure of an outdoor unit or device, and a method of operating an air conditioner.

Embodiments disclosed herein provide an air conditioner that may include an indoor unit or device having an indoor heat exchanger that evaporates or condenses a refrigerant by heat exchange with indoor air; an outdoor unit or device having a variable capacity compression device that sucks and compresses a refrigerant of a refrigerant intake passage and discharges the refrigerant to a refrigerant discharge passage, a water-refrigerant heat exchanger that condenses or evaporates a refrigerant by heat exchange with heat source water, and an outdoor expansion device installed between the indoor heat exchanger and the water-refrigerant heat exchanger; a heat source water flow path connected to the water-refrigerant heat exchanger; a pump installed on the heat source water flow path; and a variable flow valve installed on the heat source water flow path and capable of regulating the opening degree. The opening degree of the variable flow valve may be varied depending on the pressure of at least one of the refrigerant discharge passage or the refrigerant intake passage.

During a cooling operation, if the pressure of the refrigerant discharge passage is higher than a target condensation pressure, the opening degree of the variable flow valve may be increased. During the cooling operation, if the pressure of the refrigerant discharge passage is lower than a target condensation pressure, the opening degree of the variable flow valve may be decreased.

During a heating operation, if the pressure of the refrigerant intake passage is higher than a target evaporation pressure, the opening degree of the variable flow valve may be decreased. During the heating operation, if the pressure of the refrigerant intake passage is higher than the target evaporation pressure, the opening degree of the variable flow valve may be decreased.

The variable flow valve may be fully opened upon startup of the cooling operation, and the opening degree may be varied upon completion of the startup of the cooling operation. The variable flow valve may be fully opened upon startup of the heating operation, and the opening degree may be varied upon completion of the startup of the heating operation.

The air conditioner may further include an outdoor controller that controls the outdoor unit, and a variable flow valve controller that controls the variable flow valve.

The outdoor unit may further include a low-pressure sensor that senses the pressure of the refrigerant intake passage, and a high-pressure sensor that senses the pressure of the refrigerant discharge passage. The variable flow valve controller may vary the opening degree of the variable flow valve according to a sensing result of the high-pressure sensor during the cooling operation, and vary the opening degree of the variable flow valve according to a sensing result of the low-pressure sensor during the heating operation.

The variable flow valve controller may communicate with the outdoor unit or device controller. The variable flow valve controller, together with the outdoor unit controller, may be installed in the outdoor unit. When the opening degree of the variable flow valve is varied, the opening degree may be increased or decreased by a set amount.

Embodiments disclosed herein may further provide a method of operating an air conditioner. The method may include a startup control step of fully opening a variable flow valve for regulating heat source water entering or exiting a water-refrigerant heat exchanger for heat exchange between a refrigerant and heat source water in a cooling operation of the air conditioner, and a rated control step of, after the startup control step, increasing the opening degree of the variable flow valve if the pressure of the refrigerant flowing from a compression part or device compressing the refrigerant to the water-refrigerant heat exchanger is higher than a target condensation pressure and decreasing the opening degree of the variable flow valve if the pressure of the refrigerant flowing from the compression part to the water-refrigerant heat exchanger is lower than the target condensation pressure.

Embodiments disclosed herein additionally provide a method of operating an air conditioner. The method may include a startup control step of fully opening a variable flow valve for regulating heat source water entering or exiting a water-refrigerant heat exchanger for heat exchange between a refrigerant and heat source water in a heating operation of the air conditioner, and a rated control step of, after the startup control step, decreasing the opening degree of the variable flow valve if the pressure of the refrigerant flowing from the water-refrigerant heat exchanger to a compression part or device compressing the refrigerant is higher than a target evaporation pressure and increasing the opening degree of the variable flow valve if the pressure of the refrigerant flowing from the water-refrigerant heat exchanger to the compression part is lower than the target evaporation pressure. In the rated control step, if the current opening degree of the variable flow valve is maximum upon an increase in the opening degree of the variable flow valve, the current opening degree may be maintained. In the rated control step, if the current opening degree of the variable flow valve is minimum upon a decrease in the opening degree of the variable flow valve, the current opening degree may be maintained. The rated control step may be completed by fully closing the variable flow valve when the air conditioner is stopped.

By regulating the opening degree of the variable flow valve based on the operation rate of a compressor or a temperature measured in the heat source water flow path, the air conditioner may be operated while maximizing a cycle of a refrigerant, and reliability of a outdoor unit or device may be improved. Moreover, the variable flow valve may be easily controlled by the outdoor unit or device without sensing the temperature in the heat source water flow path, because the outdoor unit may control the variable flow valve according to a sensing result of a low-pressure sensor or a high-pressure sensor.

Furthermore, power consumption of the pump may be reduced by a decrease in a number of turns of the pump upon a decrease in the opening degree of the variable flow valve, and the power consumption of the pump may be further minimized by keeping the number of turns of the pump constant with respect to the opening degree of the variable flow valve.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
at least one indoor device having an indoor heat exchanger that evaporates or condenses a refrigerant by heat exchange with indoor air;
at least one outdoor device having a variable capacity compression device that sucks in and compresses a refrigerant from a refrigerant intake passage and discharges the refrigerant to a refrigerant discharge passage, a water-refrigerant heat exchanger that condenses or evaporates a refrigerant by heat exchange with heat source water, and an outdoor expansion device installed between the indoor heat exchanger of the at least one indoor device and the water-refrigerant heat exchanger;
a heat source water flow path connected to the water-refrigerant heat exchanger;
a pump installed on the heat source water flow path;
a variable flow valve installed on the heat source water flow path, wherein an opening degree of the variable flow valve is varied depending on at least one of a pressure of the refrigerant flowing from the variable capacity compression device to the water-refrigerant heat exchanger and a pressure of the refrigerant flowing from the water-refrigerant heat exchanger to the variable capacity compression device;

an outdoor device controller that controls the at least one outdoor device; and a variable flow valve controller that controls the variable flow valve, wherein the variable flow valve controller communicates with the outdoor device controller.

2. The air conditioner of claim 1, wherein, during a cooling operation, if a pressure of the refrigerant discharge passage is higher than a target condensation pressure, the opening degree of the variable flow valve is increased.

3. The air conditioner of claim 1, wherein, during a cooling operation, if a pressure of the refrigerant discharge passage is lower than a target condensation pressure, the opening degree of the variable flow valve is decreased.

4. The air conditioner of claim 1, wherein, during a heating operation, if a pressure of the refrigerant intake passage is higher than a target evaporation pressure, the opening degree of the variable flow valve is decreased.

5. The air conditioner of claim 1, wherein, during a heating operation, if a pressure of the refrigerant intake passage is higher than the target evaporation pressure, the opening degree of the variable flow valve is decreased.

6. The air conditioner of claim 1, wherein the variable flow valve is opened upon a startup of a cooling operation, and the opening degree is varied upon completion of the startup of the cooling operation.

7. The air conditioner of claim 1, wherein the variable flow valve is opened upon a startup of a heating operation, and the opening degree is varied upon completion of the startup of the heating operation.

8. The air conditioner of claim 1, wherein the outdoor device further comprises:
a low-pressure sensor that senses a pressure in the refrigerant intake passage; and
a high-pressure sensor that senses a pressure in the refrigerant discharge passage.

9. The air conditioner of claim 8, wherein the variable flow valve controller varies the opening degree of the variable flow valve according to a sensing result of the high-pressure sensor during the cooling operation, and varies the opening degree of the variable flow valve according to a sensing result of the low-pressure sensor during the heating operation.

10. The air conditioner of claim 1, wherein the variable flow valve controller, together with the outdoor device controller, is installed in the at least one outdoor device.

11. An air conditioner, comprising:
at least one indoor device having an indoor heat exchanger that evaporates or condenses a refrigerant by heat exchange with indoor air;
at least one outdoor device having a variable capacity compression device that sucks in and compresses a refrigerant from a refrigerant intake passage and discharges the refrigerant to a refrigerant discharge passage, a water-refrigerant heat exchanger that condenses or evaporates a refrigerant by heat exchange with heat source water, and an outdoor expansion device installed between the indoor heat exchanger of the at least one indoor device and the water-refrigerant heat exchanger;
a heat source water flow path connected to the water-refrigerant heat exchanger;
a pump installed on the heat source water flow path; and
a variable flow valve installed on the heat source water flow path, wherein an opening degree of the variable flow valve is varied depending on at least one of a pressure of the refrigerant flowing from the variable capacity compression device to the water-refrigerant heat exchanger and a pressure of the refrigerant flowing from the water-refrigerant heat exchanger to the variable capacity compression device, and wherein, when the opening degree of the variable flow valve is varied, the opening degree is increased or decreased by a set amount.

12. A method of operating an air conditioner, the method comprising:
opening a variable flow valve that regulates heat source water entering or exiting a water-refrigerant heat exchanger that provides heat exchange between a refrigerant and heat source water in a cooling operation of the air conditioner; and
thereafter, increasing an opening degree of the variable flow valve if a pressure of the refrigerant flowing from a compression device that compresses the refrigerant to the water-refrigerant heat exchanger is higher than a target condensation pressure or decreasing the opening degree of the variable flow valve if the pressure of the refrigerant flowing from the compression device to the water-refrigerant heat exchanger is lower than the target condensation pressure.

13. The method of claim 12, wherein if, in the increasing or decreasing, a current opening degree of the variable flow valve is at a maximum, the current opening degree is maintained.

14. The method of claim 12, wherein if in the increasing or decreasing, a current opening degree of the variable flow valve is at a minimum, the current opening degree is maintained.

15. The method of claim 12, wherein the variable flow valve is fully closed when the air conditioner is stopped.

16. A method of operating an air conditioner, the method comprising:
opening a variable flow valve that regulates heat source water entering or exiting a water-refrigerant heat exchanger that provides heat exchange between a refrigerant and heat source water in a heating operation of the air conditioner; and
thereafter, decreasing an opening degree of the variable flow valve if a pressure of the refrigerant flowing from the water-refrigerant heat exchanger to a compression device that compresses the refrigerant is higher than a target evaporation pressure or increasing the opening degree of the variable flow valve if a pressure of the refrigerant flowing from the water-refrigerant heat exchanger to the compression device is lower than the target evaporation pressure.

17. The method of claim 16, wherein if, in the decreasing or increasing, a current opening degree of the variable flow valve is at a maximum, the current opening degree is maintained.

18. The method of claim 16, wherein if, in the decreasing or increasing, a current opening degree of the variable flow valve is at a minimum, the current opening degree is maintained.

19. The method of claim 16, wherein the variable flow valve is fully closed when the air conditioner is stopped.

20. A method of operating an air conditioner, the method comprising:
opening a variable flow valve that regulates heat source water entering or exiting a water-refrigerant heat exchanger that provides heat exchange between a refrigerant and heat source water in a cooling operation of the air conditioner and in a heating operation of the air condition; and
thereafter, in the cooling operation, increasing an opening degree of the variable flow valve if a pressure of the refrigerant flowing from a compression device that compresses the refrigerant to the water-refrigerant heat exchanger is higher than a target condensation pressure or decreasing the opening degree of the variable flow valve if the pressure of the refrigerant flowing from the compression device to the water-refrigerant heat exchanger is lower than the target condensation pressure; and in the heating operation, decreasing an opening degree of the variable flow valve if a pressure of the refrigerant flowing from the water-refrigerant heat exchanger to the compression device that compresses the refrigerant is higher than a target evaporation pressure or increasing the opening degree of the variable flow valve if a pressure of the refrigerant flowing from the water-refrigerant heat exchanger to the compression device is lower than the target evaporation pressure.

21. The method of claim 12, wherein in the opening of the variable flow valve, the variable flow valve is fully opened.

22. The method of claim 16, wherein in the opening of the variable flow valve, the variable flow valve is fully opened.

23. The method of claim 20, wherein in the opening of the variable flow valve, the variable flow valve is fully opened.

* * * * *